(12) United States Patent
Reams (10) Patent No.: US 8,698,745 B2
(45) Date of Patent: Apr. 15, 2014

(54) CONFIGURING THE FUNCTIONALITY OF CONTROL ELEMENTS OF A CONTROL DEVICE BASED ON ORIENTATION

(75) Inventor: William R. Reams, Englewood, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 189 days.

(21) Appl. No.: 13/112,846

(22) Filed: May 20, 2011

(65) Prior Publication Data

US 2012/0293416 A1 Nov. 22, 2012

(51) Int. Cl.
*G09G 5/08* (2006.01)

(52) U.S. Cl.
USPC .......................................... 345/158; 345/169

(58) Field of Classification Search
None
See application file for complete search history.

(56) References Cited

U.S. PATENT DOCUMENTS

| | | | | |
|---|---|---|---|---|
| 8,130,200 | B2* | 3/2012 | Slotznick | 345/169 |
| 8,223,125 | B2* | 7/2012 | Yen | 345/163 |
| 2005/0057508 | A1* | 3/2005 | Kim | 345/163 |
| 2009/0303184 | A1 | 12/2009 | Tao et al. | |
| 2010/0001893 | A1 | 1/2010 | Kim et al. | |
| 2010/0127913 | A1 | 5/2010 | Stefanik | |
| 2011/0018803 | A1* | 1/2011 | Underkoffler et al. | 345/158 |
| 2011/0050477 | A1 | 3/2011 | Choi et al. | |
| 2012/0013536 | A1* | 1/2012 | VanDuyn et al. | 345/169 |

OTHER PUBLICATIONS

International Search Report, dated Dec. 17, 2012 for International application No. PCT/US2012/037827, 3 pages.

* cited by examiner

*Primary Examiner* — Jason Olson
(74) *Attorney, Agent, or Firm* — Seed IP Law Group PLLC (57) ABSTRACT

A control device controls the functionality of two or more sets of control elements. A processing unit of the control device determines that it is oriented in a first zone or in a second zone based on input received from a magnetometer. The first and second zones are defined with respect to a magnetic reference point and are oriented relative to a controlled device or an electronic device. If the processing unit determines that the control device is oriented in the first zone, the processing unit configures a first functionality for the first set of control elements. If the control device's orientation changes from being oriented in the first zone to being oriented in the second zone, the processing unit configures the first set of control elements with a second functionality.

19 Claims, 9 Drawing Sheets

CONFIGURING THE FUNCTIONALITY OF CONTROL ELEMENTS OF A CONTROL DEVICE BASED ON ORIENTATION

FIELD OF THE INVENTION

This disclosure relates generally to controls for electronic devices, and more specifically to configuring the functionality of control elements of a control device based on orientation.

SUMMARY

The present disclosure discloses systems, methods, and computer program products for configuring the functionality of control elements of a control device based on orientation relative to a controlled device. A control device, either alone or in combination with an associated electronic device, may control the functionality of two or more sets of control elements of the control device. A processing unit of the control device may determine that the control device is oriented in a first zone or in a second zone based on input received from at least a magnetometer, and possibly in conjunction with other sensors such as accelerometers. The first and second zones may be defined with respect to a magnetic reference point and may be oriented relative to an electronic device controlled by the control device. If the processing unit determines that the control device is oriented in the first zone, the processing unit may configure a first functionality for the first set of control elements. If the control device's orientation then changes from being oriented in the first zone to being oriented in the second zone, the processing unit may configure the first set of control elements with a second functionality.

The control device may configure a first functionality for the second set of control elements. In some cases, the control device may also configure a second functionality for the second set of control elements. The first and second functionalities may be configured based on whether the control device is oriented in the first or the second zone.

The foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, methods, and computer program products that embody various elements of the present disclosure. The described disclosure, however, may be practiced in a variety of forms in addition to those described herein.

Electronic devices (such as set top boxes, television receivers, desktop computers, laptop computers, televisions, computer monitors, electronic kitchen appliances, stereo equipment, entertainment system components, digital video recorders, digital video disc players, and so on) perform a variety of different functions. Users of such electronic devices may utilize remote control devices to control the functions performed by the electronic devices remotely as opposed to having to directly manipulate selection or control elements (such as buttons, touch screens, and so on) incorporated directly on the electronic devices. In fact, some control devices may even include selection or control elements for controlling functions of electronic devices for which the electronic device does not have direct, physical selection or control elements, instead relying on a remote control device to provide an interface to such functionality (for example, a television may not have a physical or touch screen keyboard physically associated with it, but the television's remote control device may include a physical or touch screen keyboard).

Some control devices may include one or more sets of control elements, such as a numeric keyset, a QWERTY keyset, one or more navigation devices, volume and channel controls, as well as various other dedicated or multi-function buttons or selection and control elements. For control devices with two or more sets of control elements, the multiple control element sets may have different orientations. For example, a remote control device with a long axis and a short axis may have a QWERTY keyset oriented along the long axis of the device, and a numeric keyset oriented along the short axis of the device. Furthermore, some control element sets (such as a navigation device) may only have an orientation relative to some reference point.

Some control devices may have one or more sets of control elements on one face (e.g. the top) of the control device, and one or more sets of control elements on a second face (e.g. the bottom) of the control device. For example, a remote control device may have a QWERTY keyset on the bottom, a numeric keyset on the top, and a navigation device on the bottom, on the top, or on both the bottom and top. As another example, a control device may have a touch screen on the bottom, and a numeric keyset with other dedicated keys on the top. Many other arrangements are possible. Some sets of control elements may be designed to be used in a certain orientation. For example, a QWERTY keyset may be designed for a user to type with the keys oriented similar to a keyboard for a computer or laptop with the tops of the letters on the keys facing a display device, such as a television. By way of another example, other sets of control elements, such as navigation devices, may not have an intuitive orientation unless associated with some reference point. If the orientation of the control device is determined, the orientation information may facilitate the correct operation of the sets of control elements, as intended by the user.

For control devices with multiple sets of control elements, the functionality of certain sets of control elements may be altered depending on the orientation of the control device. For example, if the control device has a QWERTY keyset on the bottom and a numeric keyset on the top, the numeric keyset may be deactivated when the control device is oriented such that the user is using the QWERTY keyset. As another example, if the control device has a navigation device such as a touchpad, track ball, optical finger navigation device (OFN) or the like, the X-Y coordinate plane of the navigation device may change (e.g. by rotating 90 degrees, etc.) as the orientation of the control device changes. Specifically, if the long axis of the remote is generally perpendicular to an electronic device, such as a television, then the Y component of the X-Y coordinate plane of the navigation device may be parallel to the long axis of the remote, while if the short axis of the remote is generally perpendicular to the electronic device, then the Y component of the X-Y coordinate plane of the navigation device may be perpendicular to the long axis of the remote.

In the present disclosure, a control device, either alone or in combination with an associated electronic device, may control the functionality of control elements of the control device. The device may determine that the control device is oriented in a first zone, or in a second zone based on input received from a magnetometer. The first and second zones may be defined with respect to a magnetic reference point (such as magnetic north) and may be oriented relative to an electronic device. If the processing unit determines that the control device is oriented in the first zone based on data received from the magnetometer, the processing unit may configure the first set of control elements with a first functionality. If the control device's orientation then changes from being oriented in the first zone to being oriented in the second zone, the processing unit may configure the first set of control elements with a second functionality.

Figure 1:
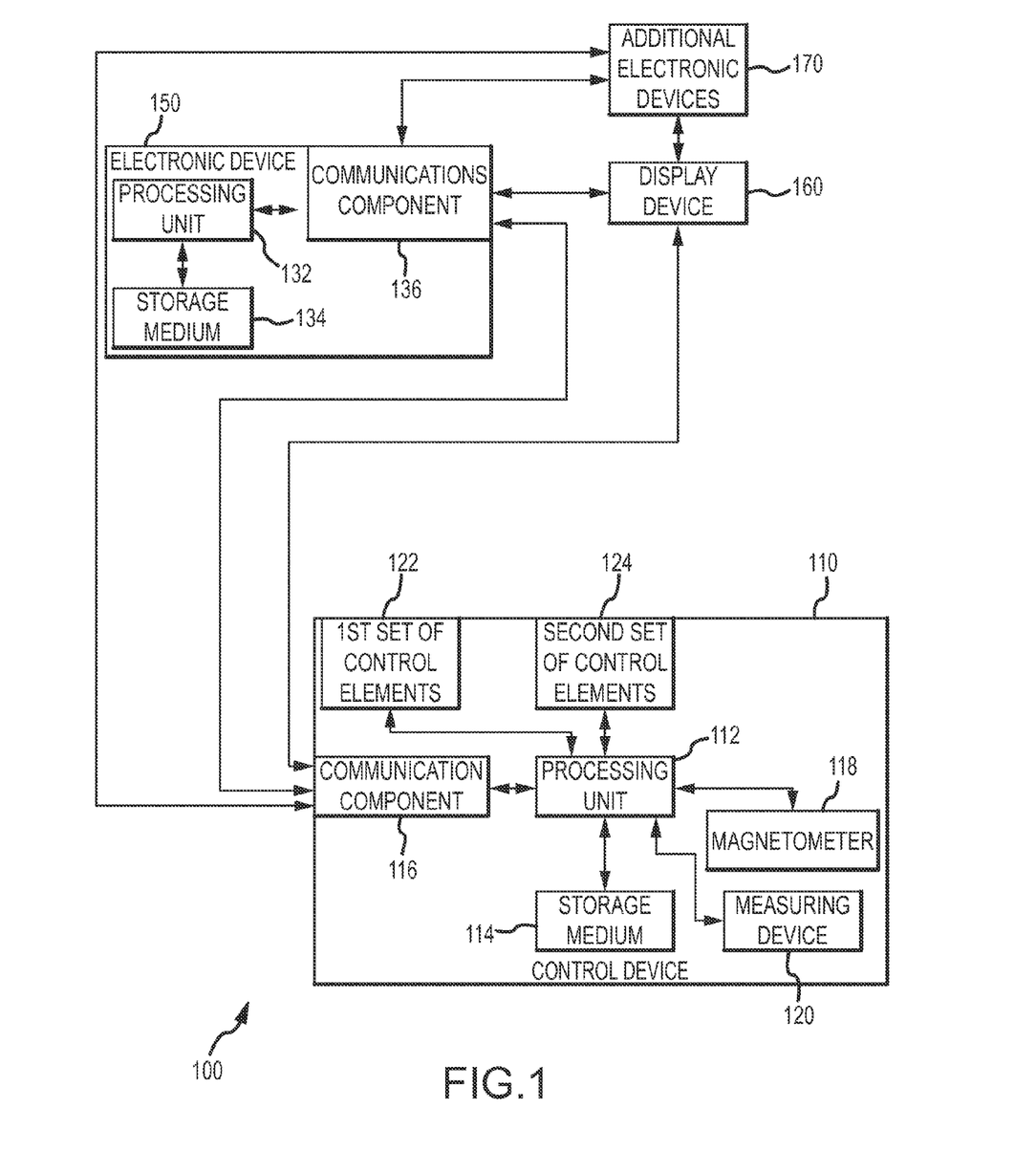
FIG. 1 is a block diagram illustrating a system for configuring the functionality of control elements of a control device based on orientation.

FIG. 1 is a block diagram illustrating a system 100 for configuring the functionality of control elements 122, 124 of a control device 110. The system may include an electronic device 150, one or more display device(s) 160, and a control device 110. The system may also include one or more additional electronic devices 170. The electronic device may be any kind of electronic device such as a set top box, a television receiver, a desktop computer, a laptop computer, a television, a computer monitor, an electronic kitchen appliance, a stereo component, an entertainment system component, a digital video recorder, a digital video disc player, an AV amplifier, a video game system, and so on. The electronic device may be controlled by the control device. The display device may be any kind of display device such as a television, a computer monitor, a cathode ray tube display, a liquid crystal display, and so on. The control device may be any kind of device that can be configured to control the electronic device such as a remote control, a mobile computer (such as a tablet computer, a smart phone, a personal digital assistant, and so on) that includes software to implement remote control functionality, and so on. The additional electronic devices may be any of the things listed above as possible electronic devices.

The electronic device 150 may include one or more processing units 132, one or more non-transitory storage media 134 (which may take the form of, but is not limited to, a magnetic storage medium; optical storage medium; magneto-optical storage medium; read only memory; random access memory; erasable programmable memory; flash memory; and so on), and one or more communication components 136. The processing unit may execute instructions stored in the non-transitory storage medium, and may also execute commands received from at least the control device 110 through the communications component 136.

The control device 110, which may be a remote control device, may include one or more processing units 112, one or more non-transitory storage media 114, one or more communication components 116 (such as infrared, radio frequency, wireless Ethernet including any of the IEEE 802.11 a/b/g/n standards, or any other communication protocol), a magnetometer 118, a first set of control elements 122, and a second set of control elements 124. In some embodiments, the control device may include one or more additional measuring devices (such as an accelerometer or a gyroscope) 120. The processing unit of the control device may execute instructions stored in the non-transitory storage medium of the control device to configure the functionality of control elements of a control device. Specifically, the processing unit may determine that the control device is oriented in a first zone or in a second zone based on input received from a magnetometer 118. The first and second zones may be defined with respect to a magnetic reference point (such as magnetic north, or some offset thereof) and may be oriented relative to an electronic device, such as the electronic device, associated with the control device. If the processing unit determines that the control device is oriented in the first zone based on data received from the magnetometer, the processing unit may configure the first set of control elements 122 with a first functionality. If, however, the processing unit determines that the control device is oriented in the second zone based on data received from the magnetometer, or if the control device's orientation changes from being oriented in the first zone to being oriented in the second zone, the processing unit may configure the first set of control elements with a second functionality. The processing unit may continue to monitor the orientation of the device based on input from the magnetometer, and continue to change the functionality of the first set of control elements based on the determined orientation of the control device.

FIG. 1 also shows an additional measuring device 120, such as an accelerometer or a gyroscope, which may provide further orientation information to the processing unit 112 of the control device 110 in order to further define a functionality for the configuration of the first set of control elements 122. FIG. 1 also shows a second set of control elements 124 of the control device. Similar to defining the functionality of the first set of control elements, the processing unit may determine the orientation of the control device and define a first or second functionality for configuration of the second set of control elements depending on whether the control device is oriented in the first or second zone.

The processing unit 112 of the control device 110 and/or the processing unit 132 of the electronic device 150 in system 100 may perform an initial setup process in order to define the first and second zones, and the boundary between them. This setup process may involve a user orienting the control device in certain positions relative to the electronic device for the processor(s) to "learn" the placement of the electronic device and the locations where the control device is likely to be used. Alternatively, or in addition to the initial setup process, the processing unit(s) may "learn" the placement of the electronic device and the locations where the control device is used by monitoring the orientation of the control device as it is used. This continued learning process may help the system 100 refine the boundary or boundaries between the first and second zones for increased accuracy in a user's unique circumstances.

Figure 2:
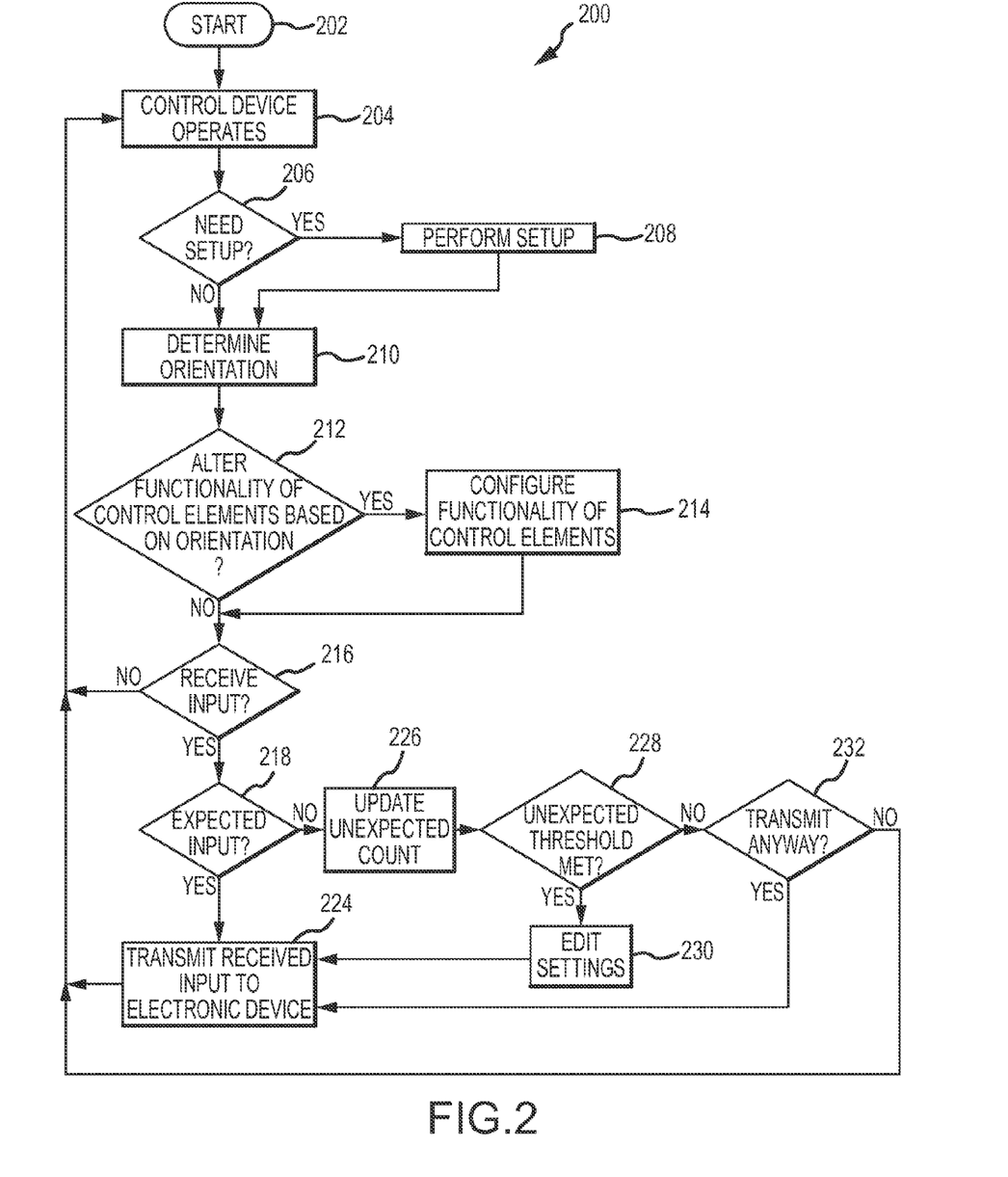
FIG. 2 is a flowchart illustrating a method for configuring the functionality of control elements of a control device based on orientation. This method may be performed by the system of FIG. 1.

FIG. 2 illustrates a method 200 for configuring the functionality of control elements of a control device based on orientation. The method 200 may be performed by the control device 110 of FIG. 1, either alone or in combination with the electronic device 150 of FIG. 1. The flow starts at block 202 and proceeds to block 204 where the control device operates. The flow then proceeds to block 206 where the processing unit 112 of the control device (alone or in conjunction with processing unit 132 of the electronic device) determines whether or not setup is needed. If so, the flow proceeds to block 208, and then to block 210. Otherwise, the flow proceeds to block 210.

Generally, the control device may need setup in order to define the first and second zones (and/or to define a boundary or boundaries between the first and second zones) with respect to a magnetic reference point (such as magnetic north or some offset thereof) and relative to the electronic device and/or the display device. The setup process may involve either the electronic device or the control device directing a user to orient the control device in certain ways relative to the electronic device and/or relative to the display device, and taking measurements via the magnetometer or other measuring device at one or more orientation(s). This may allow the control device or the electronic device to determine the approximate direction of the electronic device or display device with respect to a magnetic reference point.

At block 210, the orientation of the control device is determined and flow proceeds to block 212. Determining the orientation of the control device may involve determining whether the control device is oriented in the first or second zone. In block 212, the processing unit 112 (alone or in combination with processing unit 132 of the electronic device) determines whether the functionality of the control elements needs to be altered based on the then-current orientation of the control device. If so, flow proceeds to block 214, where the control elements are configured with the first or second functionality, depending on whether the control device is oriented in the first or second zone, respectively. If the functionality of the control elements does not need to be altered, or after the functionality is altered in block 214, flow proceeds to block 216.

In some embodiments, during the configuration of the control elements in block 214, the processing unit 112 may use the orientation determined in 210 to define the input from the first and second sets of control elements 122 and 124 in different ways prior to sending commands to the electronic device 150. For example the data from a navigation device (e.g. OFN, track ball, etc) may be sent in one coordinate system while the orientation is in the first zone, but the processing unit may rotate and/or translate the navigation data coordinate system when the orientation is changed to the second zone prior to sending the information to the electronic device 150.

At block 216, the control device 110 may receive input from a user; if so, flow proceeds to block 218, otherwise, flow returns to block 204 where the control device operates. If an input is received, the processing unit 112 (alone or in conjunction with processing unit 132 of the electronic device) determines whether the input that was received was expected based on the orientation of the device. For example, the input may be unexpected if the control device has a QWERTY keyset, the QWERTY keyset is deactivated based on the control device being oriented in a certain zone, and the input that is received is one or more keys pushed on the QWERTY keyset. If the input was expected, flow proceeds to block 224, where the received input is transmitted to the electronic device 150, and flow then returns to block 204 where the control device operates.

If the input was not expected, flow may proceed to block 226, where a count of the number of unexpected inputs received may be updated. After updating, flow may continue to block 228, where it is determined whether a threshold number of unexpected inputs have been received. A threshold number of unexpected inputs may, for example, be three. If the threshold is set at three, and three unexpected inputs have in fact been received, flow continues from block 228 to block 230, where the settings are edited regarding the boundary or boundaries between the first and second zones. After the settings are edited in block 230, flow may then proceed to block 224 where the unexpected input is transmitted to the electronic device. Note that the unexpected input may be transmitted without necessarily altering the functionality of the control elements because the input, by nature of it being "unexpected," was not expected under the functionality as of the time the input was received by the control device. In other embodiments, however, the functionality of the control elements may be altered prior to transmitting the unexpected input.

Returning to block 228, if the threshold number of unexpected inputs has not been reached, flow may proceed to block 232, where it is determined (based on a user preference), whether to transmit the unexpected input or to ignore the unexpected input until the threshold number is met. If the preference is to transmit the input regardless, flow proceeds to block 224 where the unexpected input is transmitted to the electronic device. If the preference is to not always transmit the unexpected input, flow proceeds to block 204 where the control device operates. The unexpected input process in blocks 218, 226, 228, 230, and 232 allows the control device, in some embodiments, to "learn" or refine the boundary or boundaries of the first and second zones based on a user's unique, individual circumstances.

Although FIG. 2 shows two blocks associated with a setup process (blocks 206 and 208) and five blocks associated with a learning process (218, 226, 228, 230, and 232), either one of these processes may be used, neither may be used, or both may be used (as in FIG. 2). For example, the setup process may be skipped entirely, and the control device 110 (possibly in conjunction with an electronic device) may define the first and second zones entirely by a learning process similar to that shown in blocks 218, 226, 228, 230, and 232. Alternatively, there may be an initial setup process similar to that shown in blocks 206 and 208, with no continued learning. Also, although one embodiment of learning has been described thus far, many other continued learning methods may be employed to define and refine the defined first and second zones, and the boundary or boundaries between them. For example, in some embodiments, the orientation of the control device may be measured every time the control device receives any type of input, while in other embodiments, the orientation of the control device may only be measured and determined every few seconds. In some embodiments, the orientation information may be used only to determine the correct functionality of the one or more sets of control elements 122, 124, while in other embodiments, the processing unit 112 of the control device and/or the processing unit 132 of the electronic device 150 may analyze and/or store the orientation data for each input received, and adjust the defined first and second zones or the boundary or boundaries between them based on that analyzed and/or stored data. Many other "learning" processes are also within the spirit of the present disclosure.

Furthermore, the system 100 and the method 200 may additionally provide for a user to manually adjust certain settings. For example, a user may chose to have one or both of the initial setup process or the continued learning process. Or, a user may change the sensitivity of the keys or the measuring instruments. If the continued learning process in FIG. 2 is implemented, a user may choose the unexpected threshold count (which may be, for example, 2 times, or 4 times, or 10 times, etc.), or a user may choose whether an unexpected input is transmitted even if the threshold count has not been reached.

Also, a control device 110 may have more than one set-up that is learned. For example, a remote control may have one set-up for a user that sits on the left end of the couch and a second set-up for a user that typically sits on the right end of the couch. Additionally, multiple control devices 110 communicating with a common electronic device 150 may use different settings for the first and second operational zones. The use of multiple set-ups may help avoid situations in which different users desire different functionality, even when the control device's magnetic orientation is nearly the same.

As with the general orientation determination in block 210 in FIG. 2, the orientation data for the setup and/or the continued learning process may be measured by a magnetometer 118 either alone or in combination with an additional measuring device 120, such as an accelerometer or gyroscope.

Generally, the setup and/or learning processes may be performed by the processing unit 112 in the control device, by the processing unit 134 in an electronic device 150, or by both processing units working in combination with one another.

Figure 3A:
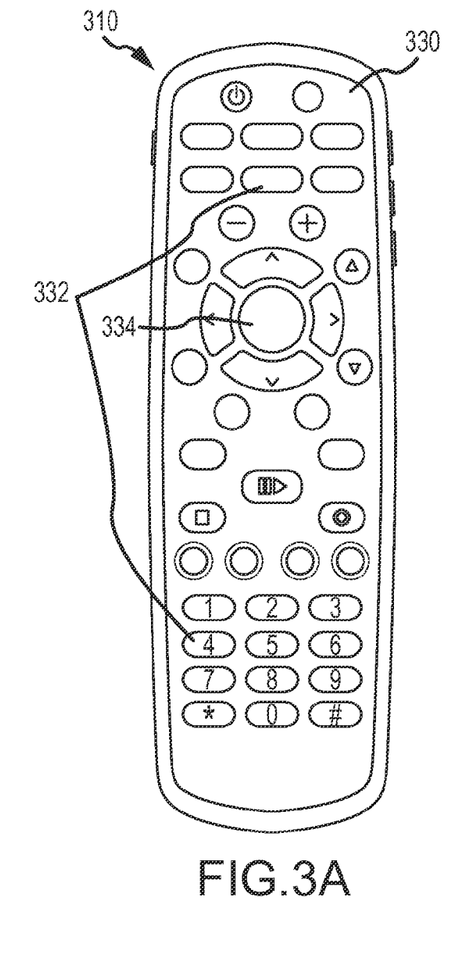
FIGS. 3A and 3B are top plan and bottom plan views, respectively, of a control device. The control device may be a part of the system of FIG. 1.
Figure 3B:
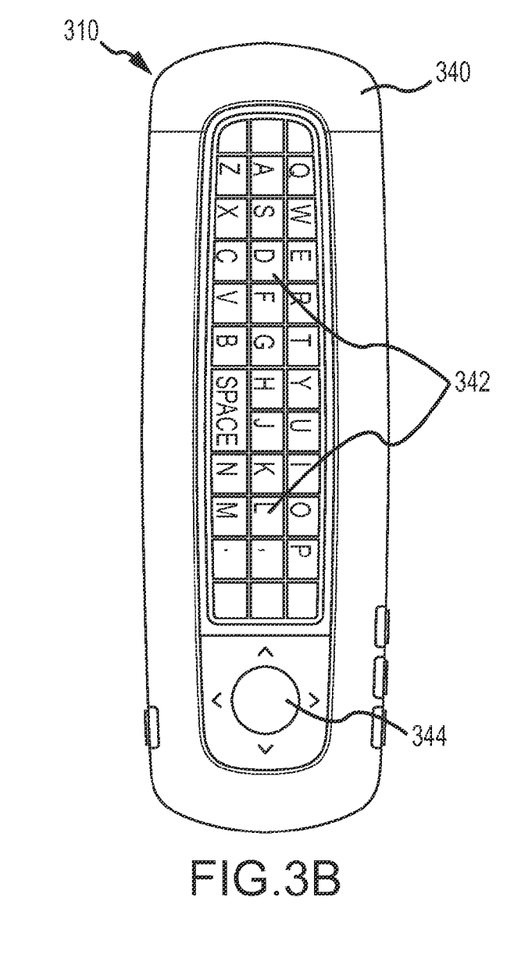

FIGS. 3A and 3B illustrate one possible embodiment of a control device 110. In this example, the control device in FIGS. 3A and 3B is a remote control device 310 for operating a television set top box implementation of an electronic device 150. FIG. 3A is a top plan view of the remote control device, and shows a first side or top 330 of the remote control device. FIG. 3A shows a first navigation device 334, and other keys 332 that include a numeric keyset and various other dedicated buttons including volume, channel, play, fast forward, pause, and so forth. FIG. 3B is a bottom plan view of the remote control device, and shows a second side or bottom 340 of the remote control device. FIG. 3B shows a second navigation device 344, and a QWERTY keyset 342. Many other control devices may be used in connection with the present disclosure. For example, a remote control device may include only one navigation device, or may include a touch screen in place of the QWERTY keyset or in place of the numeric keyset and dedicated keys. As described above, the control device may be any kind of device that may be configured to control one or more electronic device(s) 150 such as the remote control device shown in FIG. 3, a mobile computer, a smart phone, a personal digital assistant, an e-book reader or any other device that has or can be configured to control an electronic device.

Returning to FIGS. 1 and 2, the control device 110 may have a second set of control elements 124. In other embodiments, the control device may have three, four, or more sets of control elements. For example, the remote control device 310 in FIGS. 3A and 3B has at least four sets of control elements: the first navigation device 334 and other keys 332 including a numeric keyset (both on the top 330), as well as the second navigation device 344 and the QWERTY keyset (both on the bottom 340). Some of the different types of sets of control elements may be various types of QWERTY keysets (such as one similar to that shown in FIG. 3B, a pop-out one, a twist-out one, etc.), a virtual keyboard, various navigation devices (such as one similar to those shown in FIGS. 3A and 3B, a touchpad, a trackpad, a trackpoint, a trackball, a pointing stick, a joystick, a touchscreen, etc.), numeric keysets, dedicated keysets (such as volume and channel controls), scroll wheels (implemented either with a physical wheel or with a capacitive touch type device), and generally any other elements that may control or act as a selection mechanism for an electronic device. Generally, a control device may have any number of sets control elements. In the discussion that follows, however, the operation of the sample remote control device 310 of FIGS. 3A and 3B will be discussed.

Because the remote control device 310 has multiple sets of control elements, and because the navigation devices on the remote control device may be considered to have at least two possible orientations for their X-Y coordinate plane, a user may wish to alter the functionality of one or more of the four sets of control elements based on the detected orientation of the device. For example, if the long axis of the remote control device 310 is parallel to the display device 160, this may indicate that a user is using the QWERTY keyset 342 on the bottom of the remote 340. In this case, the two control element sets on the top of the remote (the first navigation device 334 and the other keys 332 including the numeric keyset) may be disabled, while the QWERTY keyset and the second navigation device 344 may be enabled. Disabling certain keysets may avoid unintended input from being transmitted to the electronic device, and may also conserve battery power because not as much data will need to be transmitted. In some embodiments, however, the functionality of the different sets of control elements may not be disabling them, but rather may be that the controlled electronic device ignores the input from certain control element sets and/or treats the input in a different manner.

Returning again to the example where the long axis of the remote control device is parallel to the display device, the X component of the X-Y coordinate plane of the second navigation device 344 may be configured to be parallel to the long axis of the remote control device. In this example, input from the first navigation device 334 may be ignored. Alternatively the processing unit 112 may treat data from navigation device 334 that is parallel to the short axis as valid Y axis or scroll-wheel-type data while ignoring X axis data.

If the user changes the orientation of the remote control device 310 such that the short axis of the remote control device is parallel to the display device 160 or to the electronic device 150, this may indicate that a user is using the numeric keyset and other keys 332 or the first navigation device 334 on the top 330 of the remote control device. Accordingly, the QWERTY keyset 342 and the second navigation device 344 may be disabled, while the first navigation device and numeric and other keyset may be enabled. Also, in this case, the X component of the X-Y coordinate plane of the first navigation device may be configured to be perpendicular to the long axis of the remote control device. As mentioned above, alternatively to being ignored, the second navigation device 334 may be used albeit with a change to its coordinate system.

An additional measuring device 120, such as an accelerometer or a gyroscope, may provide information to the processing unit 112 of a control device 110 (and/or the electronic device 150) regarding which side of the remote is "down," or which side is pointed towards the ground. This information may further enable the various sets of control elements 122, 124 on the control device to be configured with the desired functionality. Some embodiments, however, may only have a magnetometer 118, while others have a magnetometer in conjunction with an accelerometer and/or a gyroscope. Regardless, the magnetometer, alone or in conjunction with an accelerometer and/or a gyroscope, measures data and provides that data to a processing unit regarding the current orientation of the control device, which data may be used for configuring or altering the functionality of one or more sets of control elements.

As described above, two different functionalities of the one or more sets of control elements 122, 124 of a control device 110 may be (1) enabled/activated or (2) disabled/deactivated. As also described above, two different functionalities of the one or more sets of control elements such as navigation devices may be that the X component of the X-Y coordinate plane is either parallel or perpendicular to the long axis of the control device. Other functionalities are also possible. For example, if one set of control elements is a touch screen, the possible functionalities of the touch screen may include disabled, enabled with the X component of the X-Y coordinate plane parallel to the long axis of the control device, and a lower portion of the touch screen proximate one edge of the long axis of the remote control device, enabled with the X component of the X-Y coordinate plane parallel to the long axis of the control device, and a lower portion of the touch screen proximate the other edge of the long axis of the remote control device, enabled with the X component of the X-Y coordinate plane perpendicular to the long axis of the control device, and a lower portion of the touch screen proximate one edge of the long axis of the remote control device, enabled with the X component of the X-Y coordinate plane perpendicular to the long axis of the control device, and a lower portion of the touch screen proximate the second edge of the long axis of the remote control device.

Other functionalities for any type of keyset may include background illumination for the elements, such as the keys. For example, depressed keys may light up, or, entire sets of control elements may light up if it is determined that that set of control elements 122, 124 is being used or likely to be used in the near future, based on the orientation and/or on changes in orientation of the device (as measured by the magnetometer 118 and/or the accelerometer or gyroscope 120). Yet another possible functionality may involve increasing or decreasing the sensitivity of one or more sets of control elements when oriented in a certain orientation. For example, if it is determined that the QWERTY keyset is not in use, the functionality the QWERTY keyset may be that it is not completely disabled, but responds only to buttons depressed hard enough to pass a certain threshold; and if it is later determined that the QWERTY keyset is in use, then the functionality may change so that the QWERTY keyset receives and the control device transmits every button that is pushed, ever so slightly. Another functionality may be to cause something to happen in the electronic device. For example, if the user orients the control device such that the QWERTY keyset is in use, the electronic device may open a user interface that allows the user to enter text into the user interface.

Figure 4A:
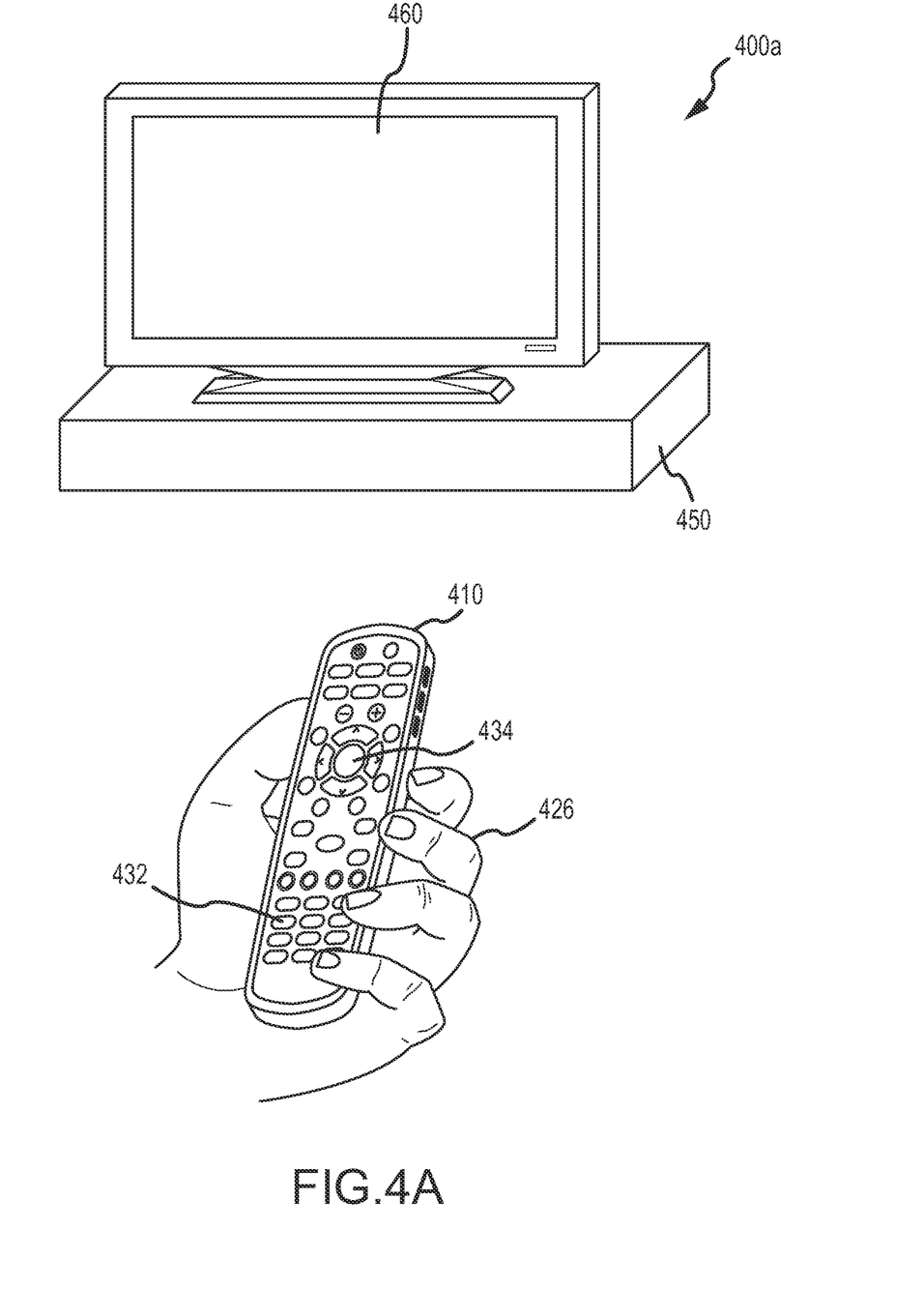
FIGS. 4A through 4F are diagrams illustrating a user utilizing a system for configuring the functionality of control elements of a control device based on orientation. The system may be the system of FIG. 1.

FIGS. 4A-4F illustrate a user 426 utilizing a system 400A-400F for configuring the functionality of control elements 122, 124 on a control device 110 similar to the remote control device 310 of FIG. 3. The system may be the system of FIG. 1. In FIG. 4A a user is pointing a remote control device 410 towards an electronic device 450 such as a set top box and a display device 460 such as a television. The remote control device has a first set of control elements, specifically a numeric keyset 432 and a navigation device 434. As illustrated, the remote control device's long axis is generally oriented perpendicular to the electronic device and the display device, and, as described in the next paragraph, this orientation places the remote control device in the defined first zone. Because the remote control device is oriented in the first zone, the first set of control elements on the top of the remote control device (the numeric keyset and the first navigation device) are active or enabled, while the second set of control elements on the bottom of the remote control device (the QWERTY keyset and the second navigation device) are inactive or disabled.

Figure 4B:
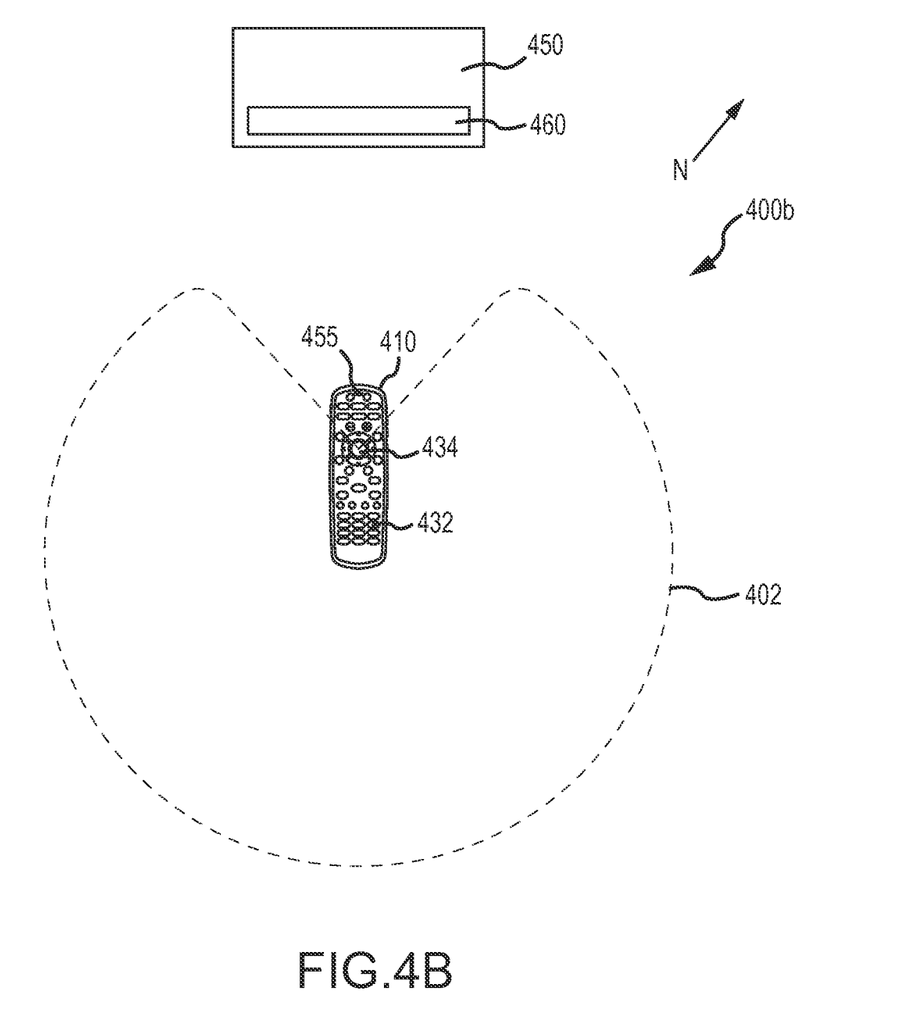

FIG. 4B shows the system 400b from above, with a dotted line 402 depicting an example of a possible boundary between a first and a second zone, with the remote control device 410 in this example being oriented in the first zone. The remote control device in FIG. 4B is shown oriented with its long axis perpendicular to the electronic device 450 and the display device 460. The processing unit in the remote control device (and/or the processing unit in the electronic device) may be able to determine this orientation based on data received from the magnetometer. The magnetometer may, for example, determine that the remote control device is oriented a certain number of degrees west of north (or some other magnetic reference point), which may be associated with being parallel to the electronic device or display device based on a setup process and/or a continued learning process. This may be true even if, for example, the user were lying on their side on a couch.

Figure 4C:
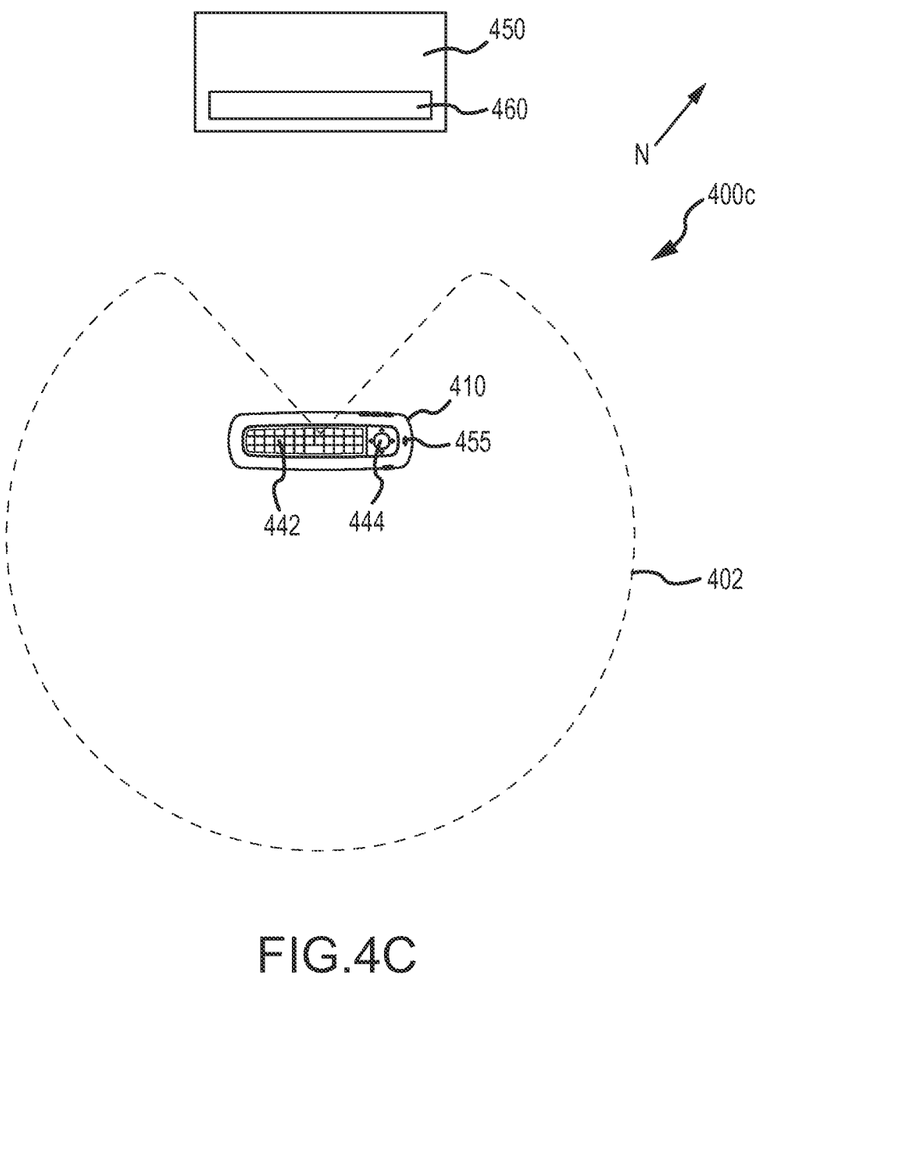

Like FIG. 4B, FIG. 4C is a view of the system 400c from above with a dotted line 402 depicting an example of a possible boundary between a first and a second zone. The remote control device 410 in FIG. 4C, however, is oriented with its long axis parallel to the electronic device 450 and the display device 460. The processing unit in the remote control device (and/or the processing unit in the electronic device) may be able to determine this orientation based on data received from the magnetometer, as above. Because the remote control device in FIG. 4C is oriented in the second zone, the first set of control elements on the top of the remote control device (the numeric keyset and the first navigation device) are inactive or disabled, while the second set of control elements on the bottom of the remote control device (the QWERTY keyset and the second navigation device) are active or enabled.

Figure 4D:
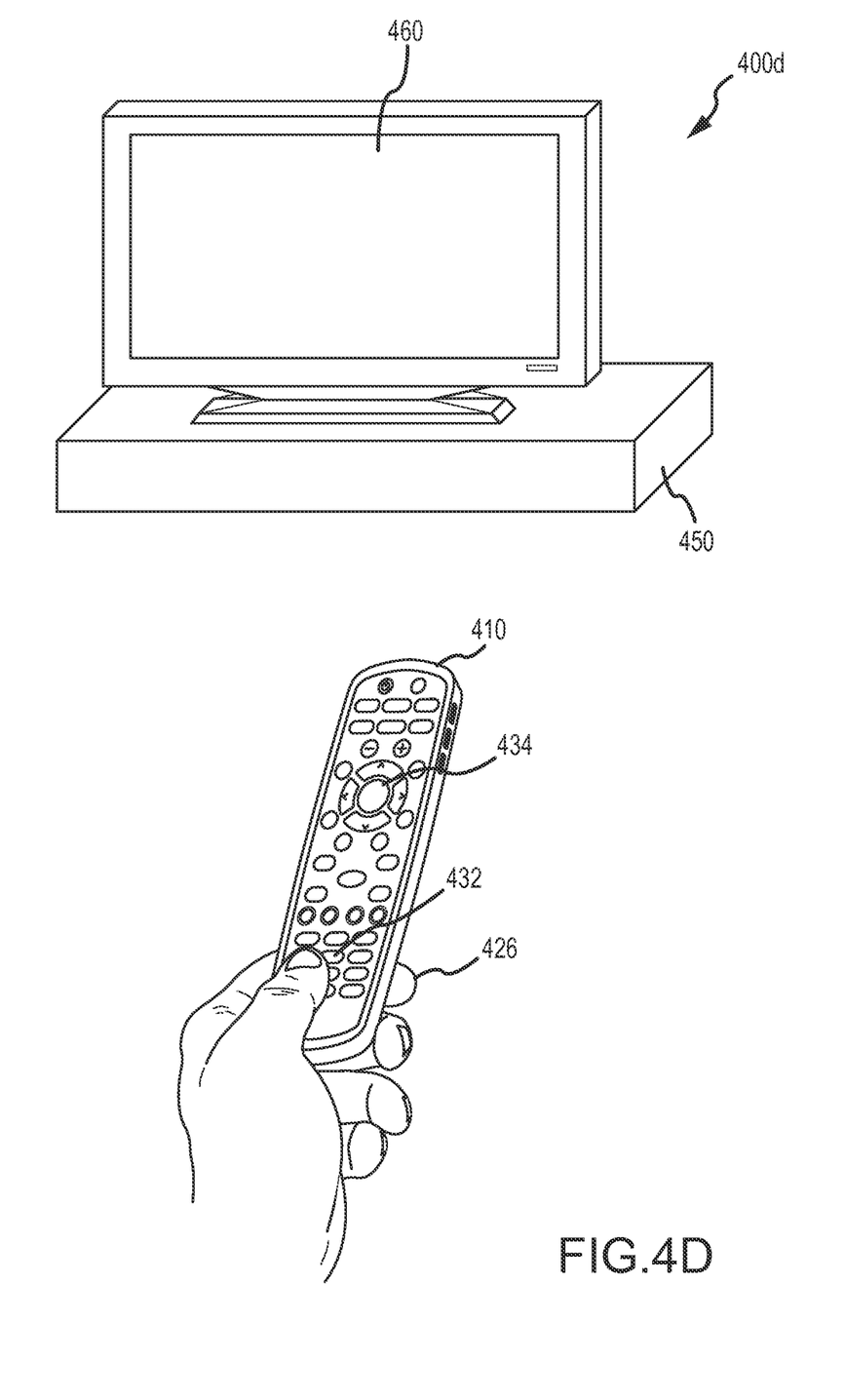
Figure 4E:
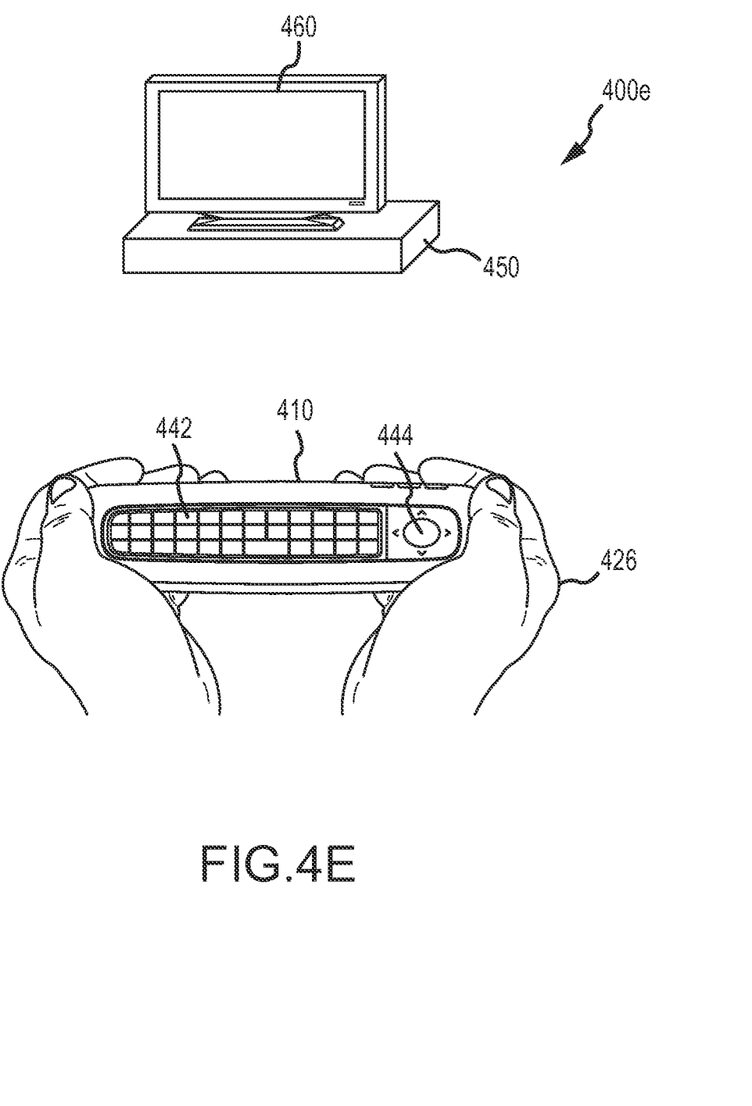
Figure 4F:
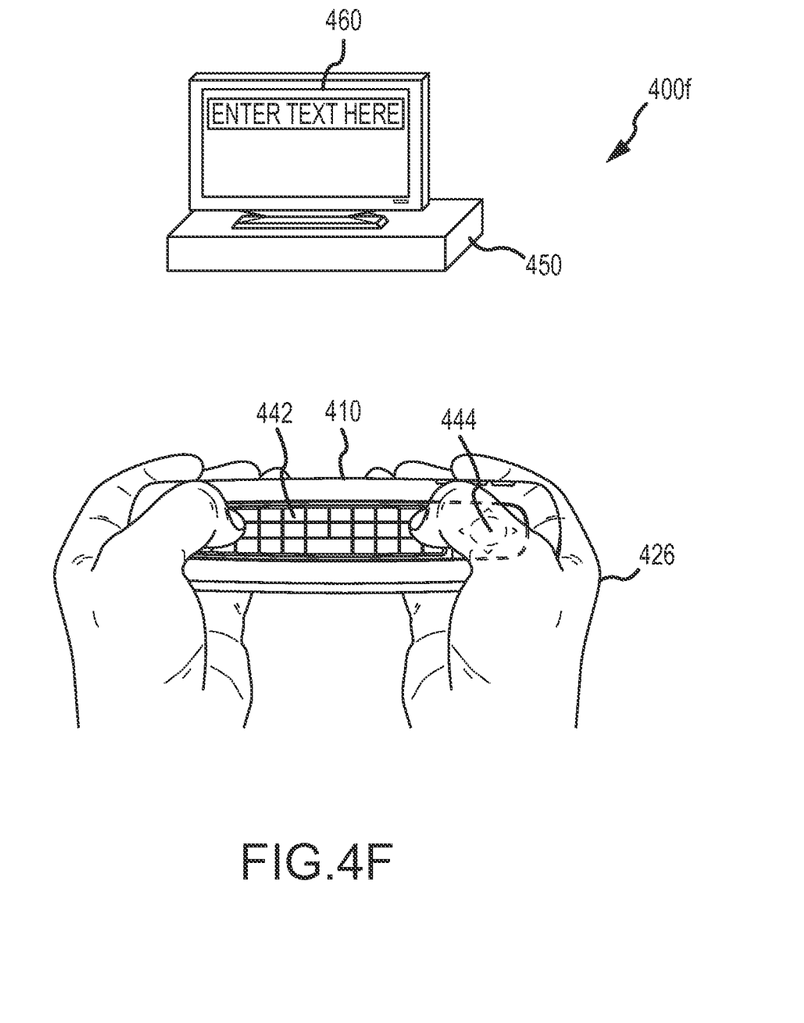

FIG. 4D illustrates a user pushing a numeric button with the remote control device 410 oriented as in FIGS. 4A and 4B. FIG. 4E illustrates a user orienting the remote control device as in FIG. 4C, and FIG. 4F illustrates a user typing on the QWERTY keyset 442 with the remote control device oriented as in FIGS. 4C and 4E.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to several embodiments, these embodiments are illustrative only, and the scope of the disclosure is not limited to them. Many variations, modifications, additions, and improvements are possible. More generally, embodiments in accordance with the present disclosure have been described in the context of particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for controlling the functionality of control elements of a control device, comprising:
    measuring, in a magnetometer of the control device, an orientation of the control device with respect to a magnetic reference point;
    storing a set of instructions in a non-transitory storage medium of the control device;
    receiving, in a processing unit of the control device, data from the magnetometer;
    determining, in the processing unit, whether the control device is oriented in a first zone or a second zone, wherein the first and second zones are defined with respect to the magnetic reference point and oriented relative to a controlled device associated with the control device by executing the set of instructions and based on the data received from the magnetometer;
    enabling a first set of control elements of the control device when the control device is oriented in a first zone; and
    disabling the first set of control elements of the control device when the control device is oriented in a second zone.

2. The method of claim 1, wherein the first set of control elements comprises a numerical keyset, and the second set of controls comprises a QWERTY keyset.

3. The method of claim 1, further comprising disabling a second set of control elements of the control device when the control device is oriented in the first zone.

4. The method of claim 3, further comprising enabling the second set of control elements when the control device is oriented in the second zone.

5. The method of claim 1, wherein the first set of control elements comprises a navigation device.

6. The method of claim 1, further comprising receiving, in the processor unit, input from an accelerometer of the control device.

7. The method of claim 1, further comprising receiving, in the processor unit, input from a gyroscope of the control device.

8. A method for controlling the functionality of control elements of a control device, comprising:
    determining an orientation of a control device with respect to a magnetic reference point;
    enabling a first set of control elements of the control device when the control device is oriented in a first zone;
    disabling the first set of control elements of the control device when the control device is oriented in a second zone;
    receiving an input when the control device is oriented in the second zone, wherein the input is unexpected based on the control device being oriented in the second zone; and
    modifying a boundary between the first and second zones based on the unexpected input.

9. A method for controlling the functionality of control elements of a control device, comprising:
    determining an orientation of a control device with respect to a magnetic reference point;
    enabling a first set of control elements of the control device when the control device is oriented in a first zone;
    disabling the first set of control elements of the control device when the control device is oriented in a second zone; and
    determining a boundary between the first and second zones relative to a controlled device in an initial setup process based on an input received from a magnetometer as a user manually orients the control device in at least a first orientation and a second orientation in response to a set of directions from the control device or the controlled device.

10. A system for controlling the functionality of control elements of a control device, comprising:
    a control device, comprising:
    at least a first and second set of control elements, the first and second set of control elements each having at least a first functionality;
    at least one magnetometer providing data indicating whether the control device is oriented in a first zone or a second zone, wherein the first and second zones are defined with respect to a magnetic reference point and oriented relative to a controlled device associated with the control device;
    at least one non-transitory storage media that stores a set of instructions; and
    at least one processing unit that receives the data from the magnetometer, executes the set of instructions to determine an orientation of the control device based on the data from the magnetometer, and configures the first set of control elements to have the first functionality when oriented in the first zone and a second functionality when oriented in the second zone, wherein the first functionality of the first set of control elements comprises enabling the first set of control elements, and the second functionality of the first set of control elements comprises disabling the first set of control elements.

11. The system of claim 10, wherein the first set of control elements comprises a numerical keyset, and the second set of controls comprises a QWERTY keyset.

12. The system of claim 10, wherein the first set of control elements comprises a navigation device, and further wherein the first functionality of the navigation device corresponds to a coordinate plane of the navigation device being oriented in a first orientation, and the second functionality of the navigation device corresponds to the coordinate plane being oriented in a second orientation, the second orientation being different than the first orientation.

13. The system of claim 10, wherein:
    the control device further comprises at least one accelerometer that measures data indicating whether the control device is oriented in the first zone or the second zone, and
    further wherein the at least one processing unit also receives data from the accelerometer, and executes the set of instructions to determine the orientation of the control device based on the data from the accelerometer, and configures the first set of control elements to have the first functionality when oriented in the first zone and the second functionality when oriented in the second zone.

14. The system of claim 10, further comprising:
    at least one gyroscope that measures data indicating whether the control device is oriented in the first zone or the second zone; and
    wherein the at least one processing unit also receives data from the gyroscope, and executes the set of instructions to determine the orientation of the control device based on the data from the accelerometer, and configures the first set of control elements to have the first functionality when oriented in the first zone and the second when oriented in the second zone.

15. The system of claim 10, further wherein the processing unit receives an input when the control device is oriented in the second zone, wherein the input is unexpected based on the control device being oriented in the second zone and the processing unit modifies a boundary between the first and second zones based on the unexpected input.

16. The system of claim 10, further wherein the processing unit defines a boundary between the first and second zones relative to the controlled device in an initial set-up process based on the input received from the magnetometer as a user manually orients the control device in at least a first orientation and a second orientation in response to a set of directions from the control device or the controlled device.

17. A computer program product comprising:
a first set of instructions, stored in at least one non-transitory machine readable medium, executable by at least one processing unit to determine that a control device is oriented in a first zone or a second zone, the determination based at least partially on an input from at least a magnetometer;
a second set of instructions, stored in the at least one non-transitory machine readable medium, executable by the at least one processing unit to configure a first functionality of a first set of control elements of the control device and a first functionality of a second set of control elements of the control device; and
a third set of instructions, stored in the at least one non-transitory machine readable medium, executable by the at least one processing unit to change the functionality of the first set of control elements to a second functionality when the control device is oriented in the second zone; wherein
the first and second zones are defined with respect to a magnetic reference point and oriented relative to a controlled device associated with the control device; and
the first functionality of the first set of control elements is associated with the control device being oriented in the first zone, wherein the first functionality of the first set of control elements comprises enabling the first set of control elements, and the second functionality of the first set of control elements comprises disabling the first set of control elements.

18. The computer program product of claim 17, wherein the processing unit utilizes the input from the magnetometer and at least one of an input from an accelerometer or an input from a gyroscope to determine that the control device is oriented in the first zone or the second zone.

19. A method for controlling the functionality of control elements of a control device, comprising:
measuring, in a magnetometer of the control device, an orientation of the controlled device with respect to a magnetic reference point;
storing a set of instructions in a non-transitory storage medium of the control device;
determining, in a processing unit of the control device, an orientation of a control device with respect to a magnetic reference point to be in either a first zone or a second zone, wherein the first and second zones are defined with respect to the magnetic reference point and oriented relative to a controlled device associated with the control device by executing the set of instructions and based on the data received from the magnetometer;
enabling a first set of control elements of the control device to be fully functional when the control device is oriented in the first zone;
disabling a second set of control elements of the control device to be completely non-functional when the control device is oriented in first zone;
enabling the second set of control elements of the control device to be fully functional when the control device is oriented in the second zone; and
disabling the first set of control elements of the control device to be completely non-functional when the control device is oriented in second zone.

* * * * *